(12) United States Patent
Moshfeghi

(10) Patent No.: US 10,404,325 B2
(45) Date of Patent: *Sep. 3, 2019

(54) MASTER UNIT FOR WIRELESSLY CHARGING SLAVE DEVICES USING DIFFERENT CHARGING MODES

(71) Applicant: Golba LLC, Rancho Palos Verdes, CA (US)

(72) Inventor: Mehran Moshfeghi, Rancho Palos Verdes, CA (US)

(73) Assignee: Golba, LLC, Rancho Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/948,142

(22) Filed: Apr. 9, 2018

(65) Prior Publication Data

US 2018/0227018 A1    Aug. 9, 2018

Related U.S. Application Data

(63) Continuation of application No. 15/659,410, filed on Jul. 25, 2017, now Pat. No. 9,973,240, which is a continuation of application No. 15/226,180, filed on Aug. 2, 2016, now Pat. No. 9,749,017.

(60) Provisional application No. 62/204,605, filed on Aug. 13, 2015.

(51) Int. Cl.
| | |
|---|---|
| *H04W 52/42* | (2009.01) |
| *H04B 5/00* | (2006.01) |
| *H04B 7/06* | (2006.01) |

(52) U.S. Cl.
CPC ......... *H04B 5/0037* (2013.01); *H04B 7/0617* (2013.01)

(58) Field of Classification Search
CPC ... H04B 5/0037; H04B 7/0413; H04W 52/42; H04W 16/28
See application file for complete search history.

(56) References Cited

U.S. PATENT DOCUMENTS

| | | | |
|---|---|---|---|
| 8,660,057 B2* | 2/2014 | Moshfeghi | H04B 1/28 370/315 |
| 9,711,978 B2* | 7/2017 | Manova-Elssibony | H02J 7/025 |

* cited by examiner

*Primary Examiner* — Tuan H Nguyen
(74) *Attorney, Agent, or Firm* — Farjami & Farjami LLP

(57) ABSTRACT

A master unit for wirelessly charging a slave device includes a plurality of radio frequency integrated circuit (RFIC) modules, each of the plurality of RFIC modules having an antenna array. The master unit is configured to select one of a single beam mode by using all or substantially all antenna arrays in the plurality of RFIC modules, a multi-beam mode by using each respective antenna array in each of the RFIC modules to form a separate beam from each RFIC module, and a customized beam pattern mode by using a customized combination of antennas in selected ones of the plurality of RFIC modules. The master unit is configured to dynamically select from one of the single beam mode, the multi-beam mode, and the customized beam pattern mode based on a location of the slave device relative to the master unit.

19 Claims, 11 Drawing Sheets

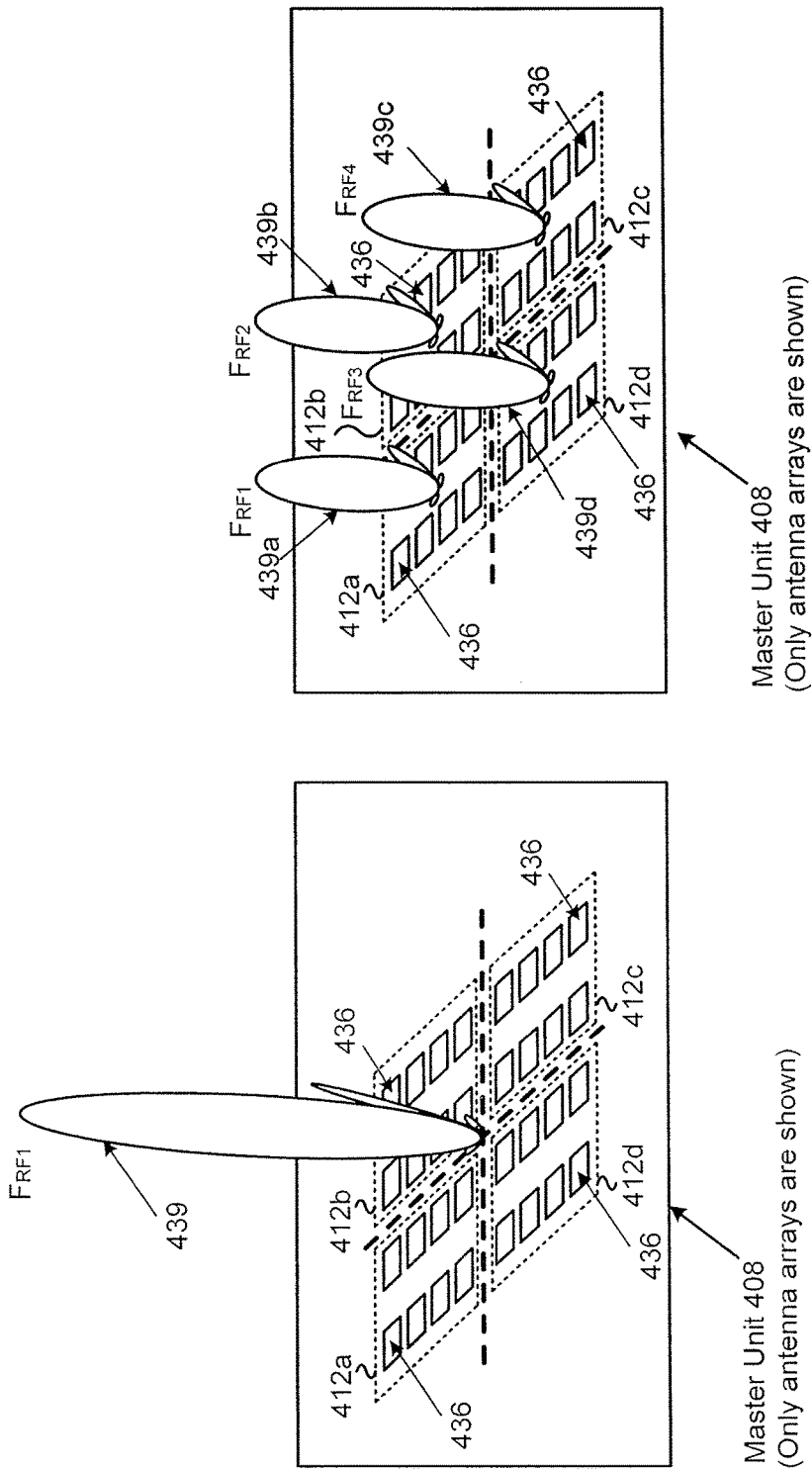

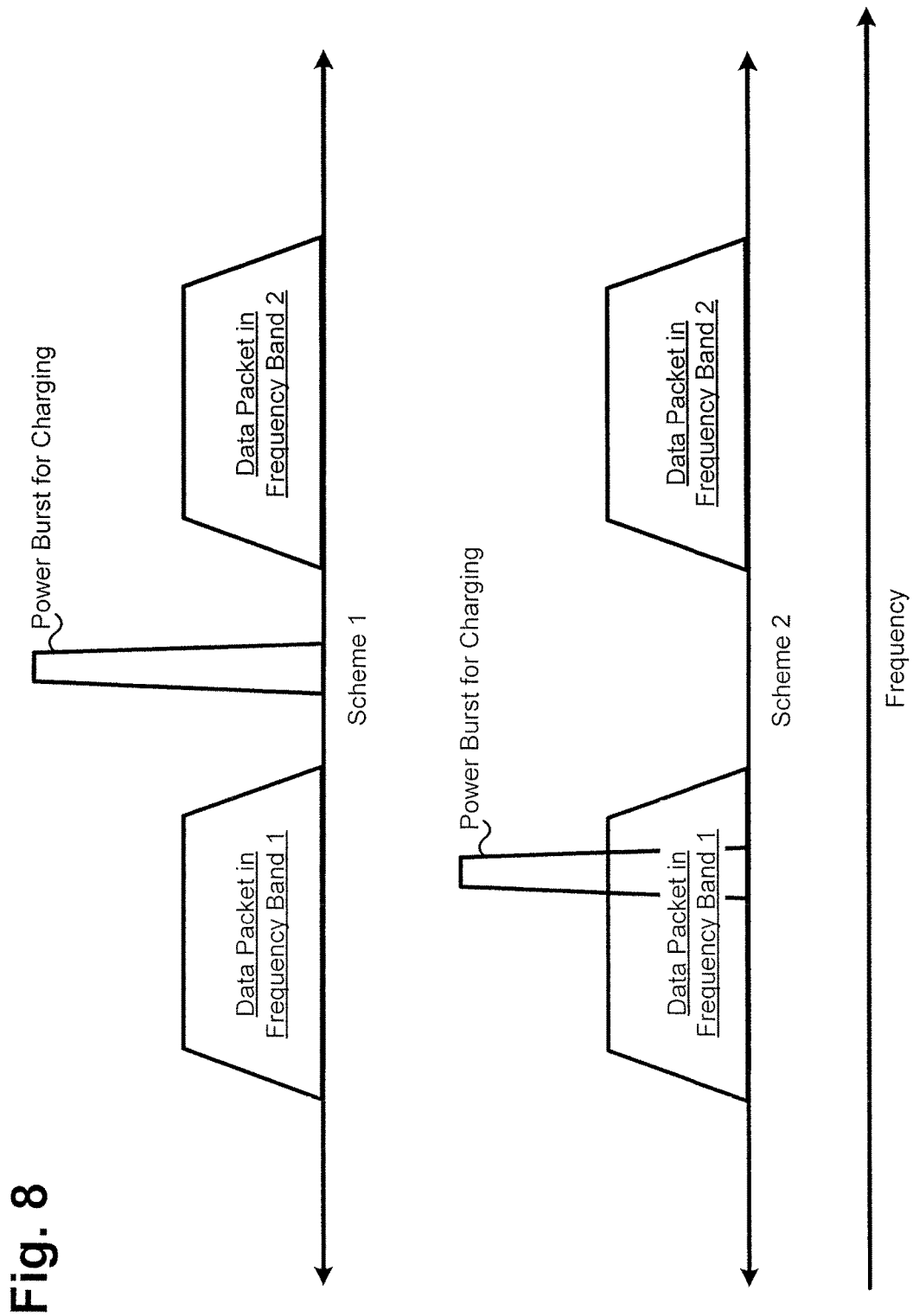

MASTER UNIT FOR WIRELESSLY CHARGING SLAVE DEVICES USING DIFFERENT CHARGING MODES

RELATED APPLICATION(S)

The present application is a continuation application of U.S. patent application Ser. No. 15/659,410, entitled "System for Wireless Charging of a Plurality of Devices," filed Jul. 25, 2017, which itself is a continuation application of U.S. patent application Ser. No. 15/226,180, entitled "Wireless Charging System," filed Aug. 2, 2016, which in turn claims the benefit of and priority to a provisional patent application titled "Wireless RF Charging using Beamforming and Distributed Transceivers," Ser. No. 62/204,605, filed on Aug. 13, 2015. The disclosures in the above-identified applications are hereby incorporated fully by reference into the present application.

BACKGROUND

Wireless charging is convenient because it removes the need for wires and connectors. For instance, wireless charging using RF power transmission does not require a device being charged to be placed at a fixed location or be tethered to a fixed power outlet by wire.

In a wireless charging system, a master unit can be used to transmit power to a slave device. To optimize power delivery, the location of the slave device receiving power relative to the master unit transmitting power needs to be taken into consideration. For example, the electromagnetic fields surrounding one or more antennas of the master unit can be divided into a near-field region and a far-field region. In the far-field region, the radiation pattern of the antennas stays relatively constant with respect to distance. When the slave device is located in the far-field region of the antennas, the antennas can focus a beam toward the slave device. However, as the slave device moves closer to the master unit, it enters the near-field region. Without proper adjustment to the antenna configuration, the far-field radiation pattern formed by the far-field antenna configuration may not achieve optimal power delivery when the slave device moves into the near-field region. For example, some of the antennas used to form far-field radiation patterns may not be useful to form near-field radiation patterns, thus wasting energy and computing resources of the master unit.

Thus, there is need in the art to provide a master unit that can dynamically configure its antennas to adjust its radiation pattern based on the location of a slave device to optimize power delivery in a wireless charging system.

SUMMARY

The present disclosure is directed to a wireless charging system, substantially as shown in and/or described in connection with at least one of the figures, and as set forth in the claims.

BRIEF DESCRIPTION OF THE DRAWINGS

FIG. 4A illustrates an exemplary master unit in a single beam mode according to one implementation of the present application.

FIG. 4B illustrates an exemplary master unit in a multi-beam mode according to one implementation of the present application.

FIG. 8 illustrates a coexistence of multiplexed power and data delivery in frequency domain according to one implementation of the present application.

DETAILED DESCRIPTION

Figure 1:
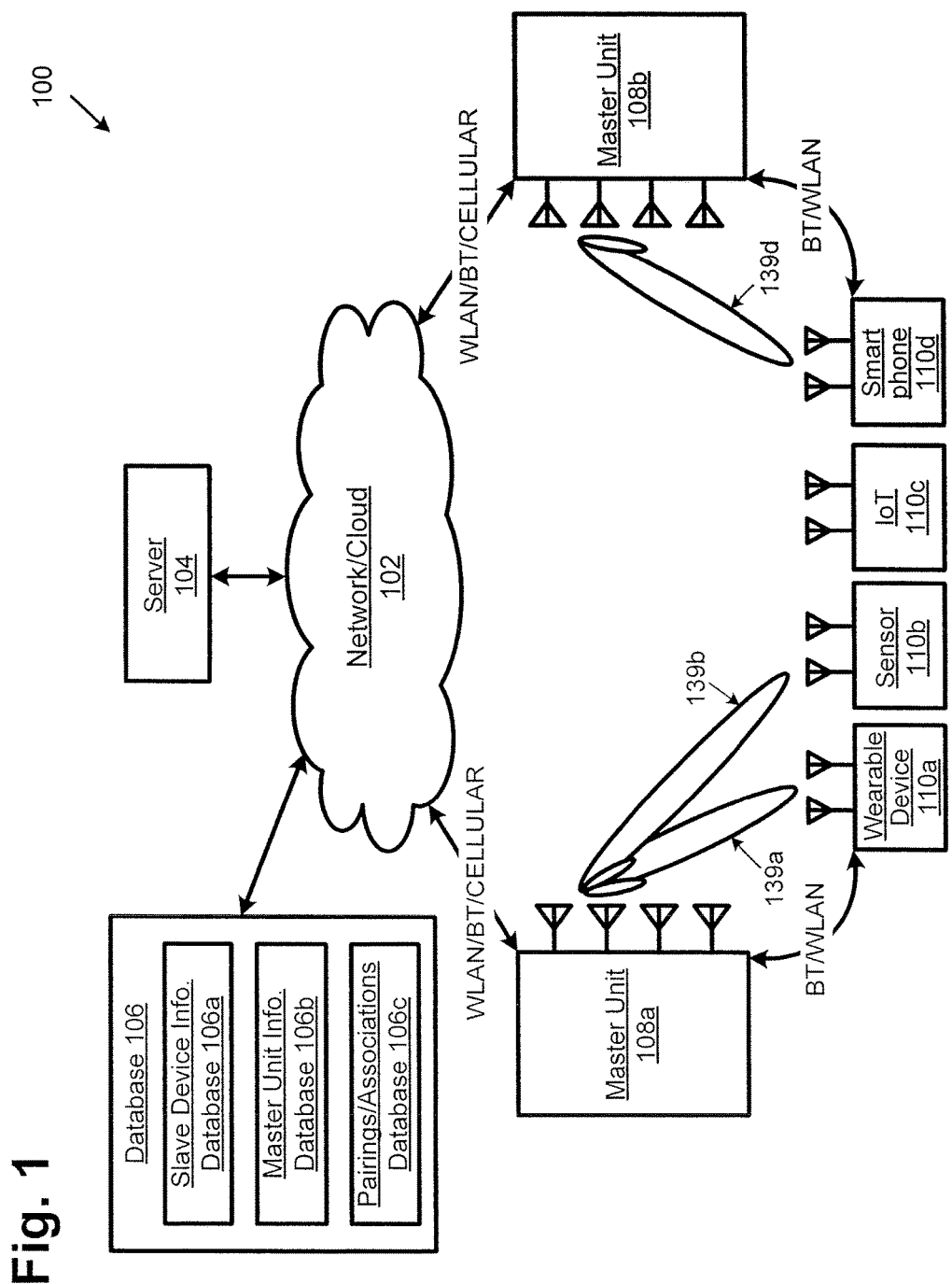
FIG. 1 illustrates an exemplary system for wireless charging according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Referring to FIG. 1, FIG. 1 illustrates an exemplary system for wireless charging according to one implementation of the present application. As illustrated in FIG. 1, system 100 includes network/cloud 102, server 104, database 106 having slave device information database 106a, master unit information database 106b, and pairings/associations database 106c, master units 108a and 108b, and slave devices 110a, 110b, 110c and 110d. Although only two master units and four slave devices are shown, it should be understood that system 100 may have many different configurations with different numbers of master units and slave devices.

As illustrated in FIG. 1, master units 108a and 108b are each connected wirelessly to network/cloud 102 through a wireless link in either a packet-based/non-packet based network or a wired/wireless network, e.g., Bluetooth, Wireless Local Area Network (WLAN), third/fourth/fifth generation (3G/4G/5G) or LTE (Long Term Evolution) cellular, Code Division Multiple Access (CDMA), Time Division Multiple Access (TDMA), Worldwide Interoperability for Microwave Access (WiMAX), Ultra-Wide Band (UWB), 60 GHz, and etc. In one implementation, a master unit can transmit multiple beams to charge multiple slave devices, where each beam is steered and focused on a different slave device. For example, master unit 108a steers and focuses beams 139a and 139b to charge slave device 110a (e.g., a wearable device) and slave device 110b (e.g., a sensor), respectively. In another implementation, a master unit can transmit a single beam and charge a single slave device, where the single beam is steered and focused on the single slave device. For example, master unit 108*b* steers beam 139*d* to charge slave device 110*d* (e.g., a smartphone). In yet another implementation, two or more master units can coordinate with each other, or are coordinated by a slave device and/or through a network by a server or a remote user/administrator who uses a networked computing device, to steer their beams onto the slave device for charging that device.

In an implementation, the slave devices may differ in their power status and capability. For example, slave device 110*a* (e.g., a wearable device) may have a low battery charge, while slave devices 110*b* (e.g., a sensor) and 110*d* (e.g., a smartphone) may have no battery charge. Slave device 110*c* (e.g., an Internet of Things (IoT)) may have been fully charged. The charging of each of slave devices 110*a*, 110*b*, 110*c* and 110*d* can be done wirelessly through radio frequency transmission.

In some implantations, system 100 uses master units 108*a* and 108*b* with narrow directional focused beams to provide wireless power to slave devices 110*a*, 110*b*, 110*c* and 110*d*. The focusing of the beam provides more power and energy for charging the slave devices. Each of the master units is typically a bigger system with a good power source (e.g. AC or a good battery life), whereas the slave devices have limited sources of power (e.g. limited battery or no battery). The master units can be stand-alone chargers, or they can be integrated into bigger systems such as a car, PC, laptop, tablet, cell phone, digital/video camera, or a multimedia device such as an iPod®. The slave devices could be any non-battery device (e.g. memory stick or memory device) or battery operated device. Some examples of slave devices are laptop, tablet, cell phone, PDA, wireless headset, wireless mouse, wireless keyboard, pager, digital/video camera, external hard drive, toy, electronic book reader, sensor, CD/DVD/cassette/MP3 player, toothbrush, lighting devices, electronic appliances, wearable devices such as a digital watch, or Internet of Things (IoT) devices, or even a car. The IoT device category may include remote sensors, smart meter devices, security alarms, safety monitoring devices, health monitoring sensors, among others. AC powered slave devices could also use this system as a backup power in case AC power goes off. Thus, a master unit could power up an AC powered slave device that temporarily has lost its AC power source. In some implementations, the master unit could be just a dedicated charging device and not communicate with the slave device other than for charging. In other implementations, master units are networked and communicates with the slave devices not only for control data for charging, but also for other data communication.

In some implementations, only authorized slave devices may receive power from one or more master units. In an implementation, charging is initiated by a slave device or by a master unit when the two are close to each other, for example either automatically or by pressing a button on the slave device or the master unit. In an implementation, a master unit selects which slave devices to power up and communicate with.

The slave devices have identifying information about themselves stored in their memories or in a database accessible by a network. The stored information can include one or more of the slave devices' media access control address (MAC address or MAC ID), network IP address, name, serial number, product name and manufacturer, capabilities, and etc. The master unit (or a controller device such as a network server, or a remote user) requests that information.

In another implementation, the slave devices are proactive and communicate with the master unit (or a controller device such as a network server, or a remote user) if they have power (e.g., "charge my battery," or "I want to send you some data," etc.) and provide their identifying information and register themselves in a slave device information database. In yet another implementation, the master unit has access to a slave device information database that includes an authorized list. This database is locally stored on the master unit or it is stored on a possibly larger networked database (e.g., slave device information database 106*a* in database 106).

In some implementations, a master unit that employs a focused directional RF beam uses beam steering to focus the beam on a particular slave device, power the slave device up slightly to get slave device's identifying information, and only continue powering up/charging and communication if the slave device's identifying information match with an entry on the authorized list. For instance, only a slave device with a certain MAC ID, network IP address, name, serial number, product name, manufacturer, capabilities, etc. may be powered up, charged or communicated with. For RF-based systems, frequency hopping methods are also used in some implementations by the master unit and authorized slave devices to allow them to get power while unauthorized nearby slave devices (that do not know the hopping sequence) do not receive much power. Similarly, a master unit that employs focused RF beams uses time hopping and/or frequency hopping to power up multiple slave devices. In some implementations, an authorized user/administrator can override the system and allow charging of an unauthorized slave or add the slave to the authorized list. The database for authorized slave devices can be locally stored on the master units or it may be stored on a networked database on the network cloud. In the latter case, the master units could access the networked database and check the slave's authorization prior to charging. In some implementations, the user of a slave device can make a payment to a server/store owner in order to have the slave become authorized for charging by specific master units.

In some implementations, only authorized master units may transfer power transfer to one or more slave devices. In an implementation, a slave device prevents non-authorized master units from trying to charge it or power it up (or networked servers from commanding master units to charge it or power it up). Slave devices can store identifying information about master units (or networked servers) that are authorized to charge them. The stored information about authorized master units or network servers can include one or more of the following information about the master units: the master units' media access control address (MAC ID), network IP address, name, serial number, product name and manufacturer, capabilities, etc. The slave device requests identifying information from the master unit or the network server. In another implementation, the master unit (or the network server) is proactive and sends its identifying information to the slave device. In another implementation, the master units register themselves and their identifying information in a master unit information database (e.g., master unit information database 106*b* in database 106). The slave device checks the master unit's information with the authorized list and if there is not a match, the slave device disables charging and/or power-up. In some implementations, the user of a slave device can override the system and allow access to an unauthorized master unit or add the master unit to the authorized list. The database for authorized master units can be locally stored on the slave devices or it may be stored on a possibly larger networked database on the network cloud. In the latter case, the slave device could access the networked database and check the master unit's authorization prior to allowing that master unit to charge it.

In some implementations, pairings/associations database 106c in database 106 is utilized to store and maintain information about slave devices and master units that are known to have been previously paired/associated by the network. Further, new slave devices and master units can be authorized to be added to pairings/associations database 106c by a slave device, a master unit, and/or a network authorized administrator.

In some implementations, the selection and power scheduling of slave devices are dependent on the priorities of slave devices' functions or data. For example, slave device 110a with a higher priority gets five minutes of scheduled charging time, while slave device 110b with a lower priority gets three minutes of scheduled charging time. In an implementation, a slave device information database stored at the master unit or a slave device information database stored in a database accessible by the network may include priorities for slave devices and their data. In an implementation, the slave devices also communicate their data (and possibly the priority of their data) to the master unit. Based on this information the master unit then decides on a course of action. In some implementations, the user of a slave device can pay more to a subscription service or store owner to have higher charging priority as compared to other slave devices that have paid less.

In different implementations, the power status of the slave devices and their power-related requests and the master unit's response strategy may vary significantly. The followings are several examples: (1) Slave device has battery and power and is ready to communicate. Master unit may communicate; (2) Slave device has battery and some charge, and slave device requests to communicate. Master unit may allow communication or overrule and charge the slave device further first (e.g. if after communicating the quality of slave device data is not high because of the low power status of slave device); (3) Slave device has battery and some charge, but slave device requests to be fully charged. Master unit may honor the request and charge the slave device or may overrule and communicate with the slave device (e.g. if live communication has higher priority); (4) Slave device has battery but battery has no charge. Master unit may charge the battery first or just power up the slave device and communicate first if communication priority is high; (5) For options 1, 2, 3, and 4 above if after communicating a slave device's battery charge level reaches zero or some predetermined low level then the battery is charged to some higher pre-deter mined level before resuming communication; (6) For options 1, 2, 3, and 4 above if there is sufficient power transferred from the master unit to the slave device then the slave device may communicate at the same time that the master unit is charging the battery; (7) Slave device has battery and after it is charged by the master unit to a sufficient level the slave device connects and communicates with nodes in another network (e.g. slave devices 110a, 110b, 110c and 110d connect to Bluetooth, WLAN, 3G/4G/5G or LTE cellular, WiMax, UWB, 60 GHz and mesh ad-hoc networks). The master unit optionally continues to charge the slave device or charge the slave device once the slave device's battery levels reach pre-set low levels; (8) slave device has no battery and needs to be powered up before communication. Master unit powers up the slave device before communicating.

In some implementations, the same frequency band/channel is used for both charging the slave device and communication, while in other implementations, different channels are used for charging and communication (e.g. two RF channels with different frequencies—one for charging and one for communication). In some implementations, the master unit also uses a control channel to inform the slave devices what it wants to do. Thus, all the commands could come over the control channel, although it is also feasible to send commands over the data communication channel as well. The control channel does not need to have high bandwidth. Thus, while the communication channel and the control channel use the same frequency in some implementations, the control channel uses a lower frequency, lower bandwidth, and lower power channel than the communication channel. The master unit may also use an induction charger or RF charger to charge its own battery if its power source is a rechargeable battery instead of AC power.

In an implementation, when the master unit is connected to a network (e.g., packet-based or non packet-based, Bluetooth, WLAN, 3G/4G/5G or LTE cellular, TDMA, CDMA, WiMax, UWB, 60 GHz, etc., or wired connection) then a powered up or charged slave device is also connected to the same network through the master unit. In another implementation, when a slave device is connected to a network (Bluetooth, WLAN, 3G/4G/5G or LTE cellular, WiMax, UWB, 60 GHz, etc., or wired connection) then the master unit gets connected to that network after the master unit charges that slave device. Thus, after powering up, that slave device not only is a slave device able to connect to its wireless network (Bluetooth, WLAN, 3G/4G/5G or LTE cellular, WiMax, UWB, 60 GHz, etc.) but the master unit is also able to connect to those networks through that slave device acting as a network node. In some implementations, if a master unit does not have a network connection and a slave device does, the master unit charges the slave device and use its network connection to connect to the network and perform networked operations such as downloading software and driver upgrades.

In some implementations, a slave device that gets powered up acts as a network node and communicates with other slave devices to form a mesh network. For instance, in FIG. 1, slave device 110a is initially powered up by master unit 108a. Master unit 108a cannot communicate with slave device 110b because slave device 110b is not within its communication range. However, master unit 108a can communicate with slave device 110a, and slave device 110a can in turn communicate with slave device 110b. Likewise, slave device 110b can communicate with slave device 110c, etc. Thus, by charging slave device 110a, master unit 108a has connected itself to a mesh network of slave devices and other networks that it was not connected to before.

In some implementations, slave devices that get charged may act as master units to charge other slave devices. In FIG. 1, slave device 110d is charged by master unit 108b. Slave device 110b also needs to be charged. In one implementation, slave device 110d may act as a master unit to charge slave device 110b. This may for example be because slave device 110b is too far from master unit 108b for charging.

In some implementations, a network server is in command and is the "real" master unit. For example, in FIG. 1, server 104 instructs master unit 108b to power up the slave devices in its vicinity and requests information from the slave devices. Master unit 108b then sends the slave devices' identifying information and any matching entries it has in its own database (together with any slave device requests) to server 104, server 104 further searches slave device information database 106a for additional identifying and matching information, and then instructs master unit 108b on a course of action (e.g. charge one or more authorized slave devices, but no further action with unauthorized slave devices). In some implementations, an authorized remote user can use network/cloud 102 to connect to and control server 104, which in turn controls master units 108a and 108b as just described. Thus, depending on which component is in control (remote user, server, or a master unit) that component monitors the power status of the slave devices, decides which subset of those slave devices get charged and what their charging priorities are.

In some implementations, the master unit uses a narrow focused RF beam for charging. Converting RF signals to DC power can be done in Radio-Frequency Identification (RFID) far-field applications. In near-field RFID applications, where the distance between the RFID reader and the tag is less than the wavelength of the signal, mutual inductance can be used for communication. However, in far-field RFID applications, where the separation distance between the RFID reader and the tag is much greater than the wavelength of the signal, backscattering can be used for communication. With backscattering a tag first modulates the received signal and then reflects it back to the reader.

There are several important differences between the disclosed implementations of the present application and those of far-field RFID which are described in the present application. For instance, RFID does not use directional beams and hence spreads the power of the transmission over a wider space and unnecessarily exposes humans to electromagnetic radiation. RFID tags also require little power to operate (e.g. the receive power is of the order of 200 microwatts) compared to the slave device devices that the disclosed implementations of the present application powers-up and communicates with. For example, the receive power for the slave devices in some implementations of the present application is of the order of milliwatts and higher. The upper receive power range depends on the transmit drivers and the size of the coils or antennas, and in some implementations goes above the Watt range. RFID operates in lower frequencies (e.g. less than 960 MHz) and hence provides smaller communication bandwidths and requires much bigger antennas compared to the higher frequencies used in different implementations of the present application. Also, RFID uses backscattering for communication which is a low data rate method because the antenna is turned on and off by the data like an on-off modulation switch. The implementations of the present application provide a much higher data rate because standard wireless transceiver modulation methods are used (e.g. modulations for cellular, IEEE 802.11 standards, Bluetooth) and then the data is sent to the antenna.

In contrast to RFID, some implementations of the present application use narrow directional focused beams in order to simulate a wire connection for charging and communication. This focusing of the beam provides more power and energy for charging slave device devices. A directional antenna is an antenna which radiates the power in a narrow beam along a certain angle and directed to a certain area or receive antenna. Some implementations of the present application use directional antennas that provide a large gain in their favored direction. Some implementations use a group of antennas (an antenna array) arranged to provide a large gain in a favored direction.

Figure 2A:
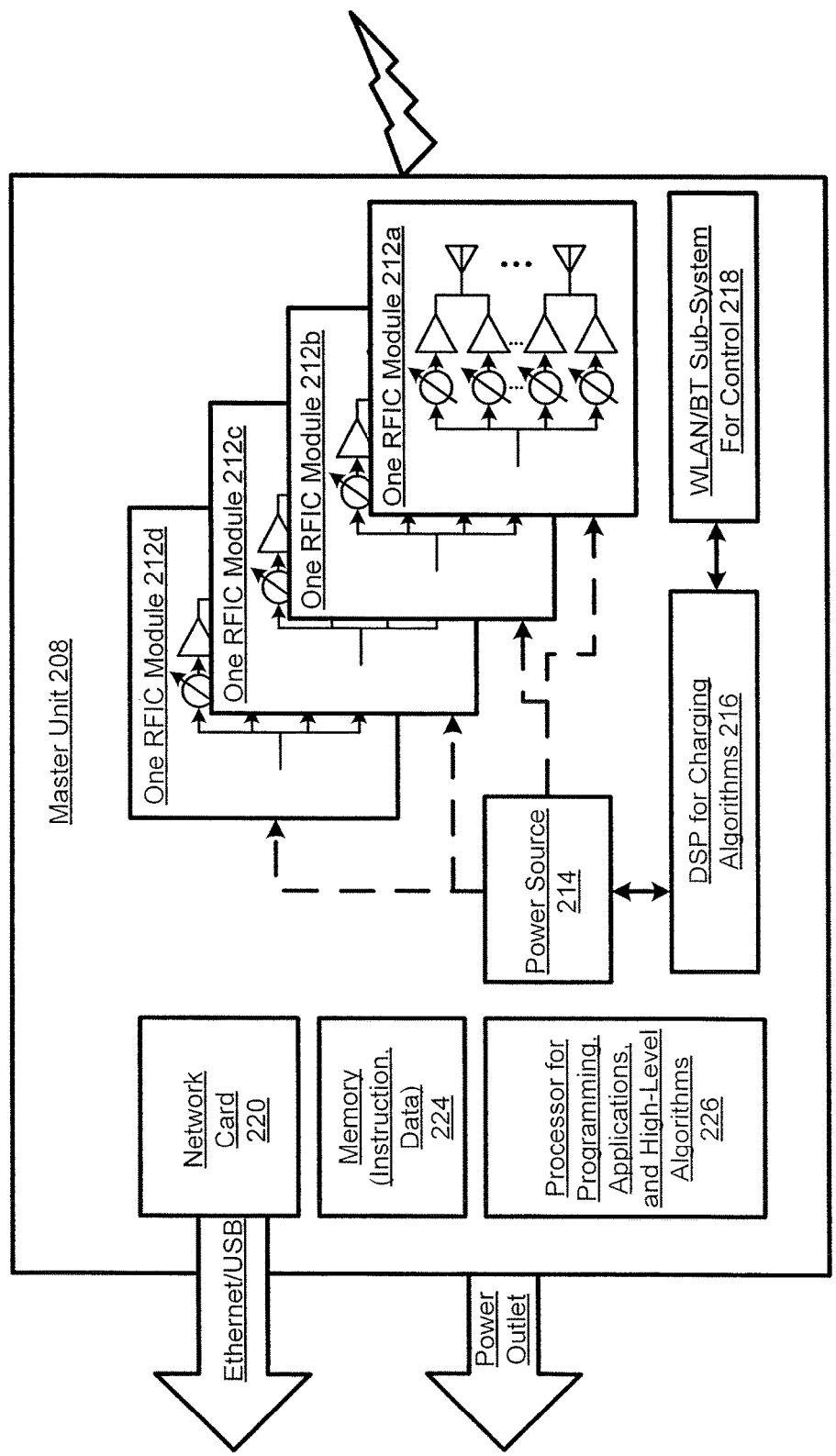
FIG. 2A illustrates an exemplary master unit according to one implementation of the present application.

Referring to FIG. 2A, FIG. 2A illustrates an exemplary master unit according to one implementation of the present application. As shown in FIG. 2A, master unit 208 includes radio frequency integrated circuit (RFIC) modules 212a, 212b, 212c and 212d, power source 214, digital signal processor (DSP) for charging algorithms 216, WLAN/BT sub-system for control 218, network card 220, memory 224, and processor for programming, applications, and high-level algorithms 226. As illustrated in FIG. 2A, master unit 208 may have its own power source or be connected to a power outlet, and deploy one or more RFIC modules 212a, 212b, 212c and 212d for transmitting power to one or more slave devices. Also, master unit 208 may be connected to a network, such as network/cloud 102 in FIG. 1, through its network card 220 using either a wired or wireless connection. Power source 214 such as a radio frequency power source is coupled to DSP for charging algorithms 216, which together provide power and phase shift signals to one or more RFIC modules 212a, 212b, 212c and 212d to focus the transmit power on one or more slave devices for optimum power transfer. DSP for charging algorithms 216 possesses signal processing capabilities for processing data and implementing algorithms related to programming and configuring RFIC modules 212a, 212b, 212c and 212d within master unit 208 by, for example, providing them with phase shift signals. WLAN/BT sub-system for control 218 is configured to exchange information with one or more slave devices through a low power communication link, such as a low energy Bluetooth/WLAN channel. For example, feedback provided by one or more slave devices through this control channel may be used for adjusting the configurations of the master unit.

Figure 2B:
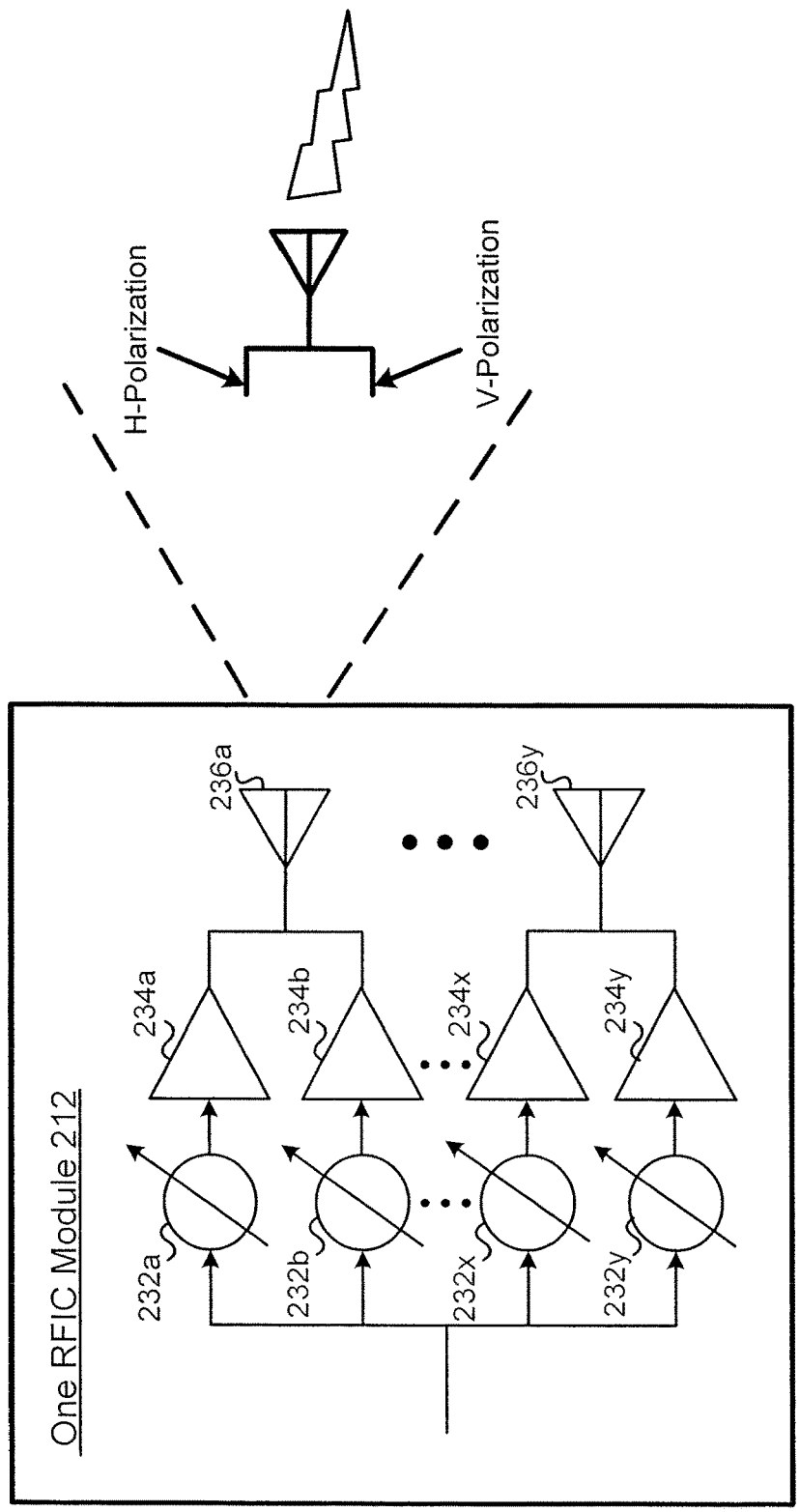
FIG. 2B illustrates a portion of an exemplary master unit according to one implementation of the present application.

Referring to FIG. 2B, FIG. 2B illustrates a portion of an exemplary master unit according to one implementation of the present application. As illustrated in FIG. 2B, RFIC module 212 may correspond to any of RFIC modules 212a, 212b, 212c and 212d of master unit 208 in FIG. 2A. In the present implementation, RFIC module 212 includes phase shifters 232a and 232b and amplifiers 234a and 234b coupled to antenna 236a. RFIC module 212 also includes phase shifters 232x and 232y and amplifiers 234x and 234y coupled to antenna 236y. Phase shifters 232a and 232b through phase shifters 232x and 232y can be individually programmed, by DSP for charging algorithms 216 in FIG. 2A, to form and configure radiation patterns for optimal power transfer to one or more slave devices based on their locations relative to one or more RFIC modules 212a, 212b, 212c and 212d of master unit 208, for example. In an implementation, amplifiers 234a and 234b through amplifiers 234x and 234y may be power amplifiers or variable gain amplifiers. Although only two antennas and four phase shifter-amplifier branches are shown in FIG. 2B, it should be understood that RFIC module 212 may have many different configurations with different numbers of antennas, phase shifters and amplifiers.

In the present implementation, dual power amplifiers and phase shifters per antenna are deployed. For example, phase shifter 232a and amplifier 234a are configured to phase shift and amplify, respectively, a signal having horizontal (H) polarization, while phase shifter 232b and amplifier 234b are configured to phase shift and amplify, respectively, a signal having vertical (V) polarization. Antenna 236a has dual feeds for horizontal and vertical polarizations. Similarly, phase shifter 232x and amplifier 234x are configured to phase shift and amplify, respectively, a signal having horizontal (H) polarization, while phase shifter 232y and amplifier 234y are configured to phase shift and amplify, respectively, a signal having vertical (V) polarization. Antenna 236y has dual feeds for horizontal and vertical polarizations.

For each antenna, a signal provided at each polarization feed, H-polarization feed and V-polarization feed, passes through a separate phase shifter and amplifier path. Therefore, the relative power between the two polarizations can be adjusted through the separate amplifiers. Also, the relative phases between the two feeds can be controlled through the two separate phase shifters. The availability of two polarization feeds with programmable relative power and phase enables the master unit to create a polarization setting that is aligned with the polarizations at antennas of the slave device when it is charging. Even in implementations where the slave device supports a single polarization antenna implementation, the power delivered to the receiving antennas of the slave device is aligned with its polarization for maximum power harvest, for any propagation realization and relative orientation between the master unit and the slave device.

Tracking and search algorithms may be used to identify the relative power and phase of signals feeding to the antennas of the master unit. In some implementations, an iterative search may be conducted where the master unit would sweep over several combinations, and the slave device would report back the harvested power level per each combination through the low power control link. The best combination would then be selected for power delivery. A new search may be triggered periodically or performed as the environment changes.

In some implementations, different RFIC modules within the master unit may operate at different RF carrier frequencies. These RF frequencies may belong to the same band (e.g., operating at different frequencies within the 60 GHz band), or they may belong to different RF bands (e.g., operating at a combination of 60 GHz, 5 GHz, 2.4 Ghz, and 900 MHz bands). In some implementations, different antennas each optimized for a frequency band are deployed. For examples, different physical antennas are deployed (one tuned to 2.4 GHz, another to 5 GHz, etc). In other implementations, a configurable single antenna structure is deployed that can be configured to resonate and radiate at different frequency bands (e.g. 2.4 GHz band, 5 GHz band, 60 GHz band) depending on the frequency of operation.

Figure 3:
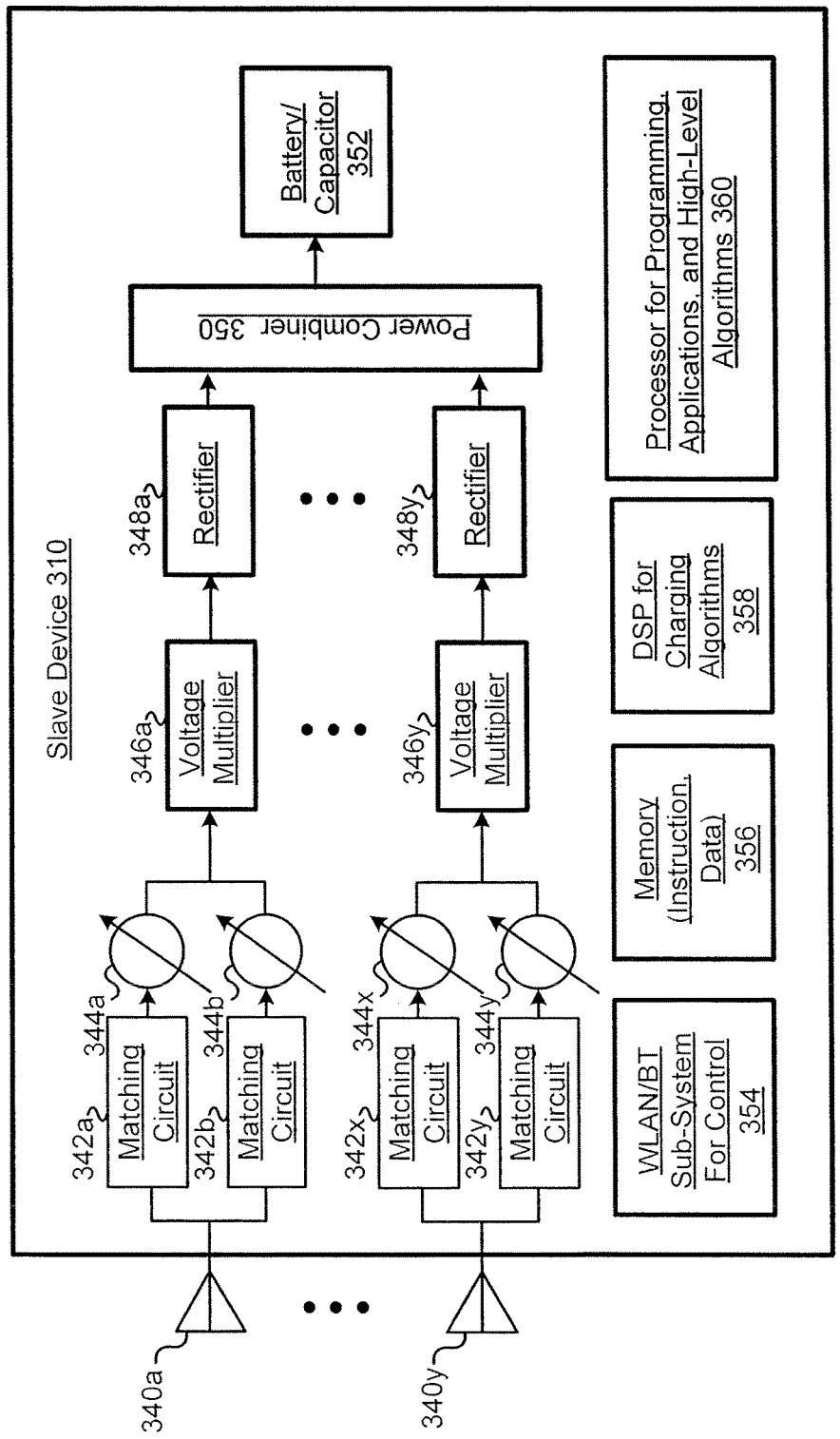
FIG. 3 illustrates an exemplary slave device according to one implementation of the present application.

Referring to FIG. 3, FIG. 3 illustrates an exemplary slave device according to one implementation of the present application. As illustrated in FIG. 3, slave device 310 includes antennas 340a through 340y, dual matching circuits 342a and 342b for antenna 340a, through dual matching circuits 342x and 342y for antenna 340y, dual phase shifters 344a and 344b for antenna 340a, through dual phase shifters 344x and 344y for antenna 340y, voltage multipliers 346a through 346y, rectifiers 348a through 348y, power combiner 350, battery/capacitor 352. Slave device 310 may also include other components, such as WLAN/BT sub-system for control 354, memory 356, digital signal processor (DSP) for charging algorithms 358, and processor for programming, applications, and high-level algorithms 360.

In one implementation, phase shifters 344a and 344b through phase shifters 344x and 344y may be optional for power combining across different polarizations and antennas before delivering the combined power to the corresponding rectifiers, such as rectifiers 348a through 348y, respectively. Voltage multipliers 346a through 346y may be used to adjust the voltage levels of the signals that feed to rectifiers 348a through 348y, respectively, for example to match the required level specified in the rectifiers' specifications. The harvested power from rectifiers 348a through 348y can then be combined by power combiner 350 and used to charge battery/capacitor 352. Although antennas 340a through 340y are shown in FIG. 3 to have dual feeds for horizontal and vertical polarizations, in another implementation, antennas 340a through 340y may each have a single polarization feed.

Referring to FIG. 4A, FIG. 4A illustrates an exemplary master unit in a single beam mode according to one implementation of the present application. In the present implementation, master unit 408 in FIG. 4A may correspond to at least one of master units 108a and 108b in FIG. 1, and master unit 208 in FIG. 2A. As illustrated in FIG. 4A, master unit 408 includes RFIC modules 412a, 412b, 412c and 412d, each of which includes an antenna array of antennas 436.

As illustrated in FIG. 4A, in the single beam mode, master unit 408 uses all or substantially all antenna arrays in RFIC modules 412a, 412b, 412c and 412d to form single beam 439, for example, toward a slave device (not explicitly shown in FIG. 4A). In the present implementation, as master unit 408 selects the single beam mode, all or substantially all antennas 436 in each of RFIC modules 412a, 412b, 412c and 412d are coordinated and co-phased to form a single powerful beam at a single RF frequency $F_{RF1}$. Master unit 408 selects the single beam mode when the slave device is at the far-field range of antennas 436 of master unit 408. As the slave moves closer to master unit 408, master unit 408 may dynamically switch from the single beam mode to a multi-beam mode or a customized beam pattern mode based on the location of the slave drive relative to master unit 408.

Referring to FIG. 4B, FIG. 4B illustrates an exemplary master unit in a multi-beam mode according to one implementation of the present application. In the present implementation, master unit 408 in FIG. 4B corresponds to at least one of master units 108a and 108b in FIG. 1, and master unit 208 in FIG. 2A. As illustrated in FIG. 4B, master unit 408 includes RFIC modules 412a, 412b, 412c and 412d, each of which includes an antenna array of antennas 436. In the multi-beam mode, master unit 408 reconfigures its RFIC modules 412a, 412b, 412c and 412d and their corresponding antennas 436 to function as four sub-arrays each forming a separate beam. For example, the corresponding antennas 436 in each of RFIC modules 412a, 412b, 412c and 412d form four separate beams 439a, 439b, 439c and 439d, respectively. In one implementation, the antenna array of each of RFIC modules 412a, 412b, 412c and 412d is configured to operate at a different frequency, such as $F_{RF1}$, $F_{RF2}$, $F_{RF3}$, and $F_{RF4}$, respectively.

In contrast to the single beam mode, where all or substantially all of antennas 436 in each of RFIC modules 412a, 412b, 412c and 412d are coordinated and co-phased to form a single beam, in the multi-beam mode, master unit 408 utilizes each respective antenna array in each of RFIC modules 412a, 412b, 412c and 412d to form a separate beam in each RFIC module. By splitting the single large array into smaller sub-arrays, the far-field range in the multi-beam mode becomes closer to the smaller sub-arrays, because the far-field range is scaled down proportional to the number of antennas of the antenna array. As a result, the separate antenna arrays of RFIC modules 412a, 412b, 412c and 412d lead to a smaller range for delivering power, and are suitable for delivering power to one or more slave devices in the near-field range.

In some implementations, the multi-beam mode shown in FIG. 4B may be utilized when master unit 408 cannot reliably determine an antenna configuration that points a high fidelity narrow and directional beam at the slave device. As illustrated in FIG. 4B, each of beams 439a, 439b, 439c and 439d has a greater beam width than that of beam 439 in FIG. 4A. As a result, beams 439a, 439b, 439c and 439d may provide better diversity and fidelity in successfully delivering power to one or more slave devices. Furthermore, the multi-beam mode may be utilized when regulatory limitations on power emission levels (e.g., maximum Equivalent Isotropically Radiated Power—EIRP) does not allow for forming a highly directional beam that utilizes all antenna elements for a single beam and a single frequency. In some implementations, beams 439a, 439b, 439c and 439d formed by respective antenna arrays in RFIC modules 412a, 412b, 412c and 412d may have the same frequency or frequency band. For example, $F_{RF1}$, $F_{RF2}$, $F_{RF3}$, and $F_{RF4}$ may have the same frequency or frequency band. In some implementations, master unit 408 is configured to charge multiple slave devices using beams 439a, 439b, 439c and 439d in the multi-beam mode. For example, master unit 408 is configured to charge four separate slave devices using corresponding beams 439a, 439b, 439c and 439d in the multi-beam mode.

In some implementations, power delivery robustness is a figure of merit, in which case transmitting power over four beams and different frequencies can lead to higher robustness and reliability. In other words, since the antenna array of each of RFIC modules 412a, 412b, 412c and 412d is configured to operate at a different frequency, such as $F_{RF1}$, $F_{RF2}$, $F_{RF3}$, and $F_{RF4}$, the interference between neighboring near-field beams 439a, 439b, 439c and 439d is reduced, resulting in robust and reliable power delivery in a wide area covered by multiple wide beams (in this example four wide beams) to a single or multiple slave devices in the near-field range.

Although, the present implementation shows that each respective antenna array in each of RFIC modules 412a, 412b, 412c and 412d forms one beam, it should be understood that RFIC modules 412a, 412b, 412c and 412d may each divide its antenna array into smaller groups of sub-arrays to form separate beams. For example, each of RFIC modules 412a, 412b, 412c and 412d may form multiple beams. As the slave device moves even closer to master unit 408, master unit 408 may switch from the multi-beam mode to a customized beam pattern mode.

Figure 4C:
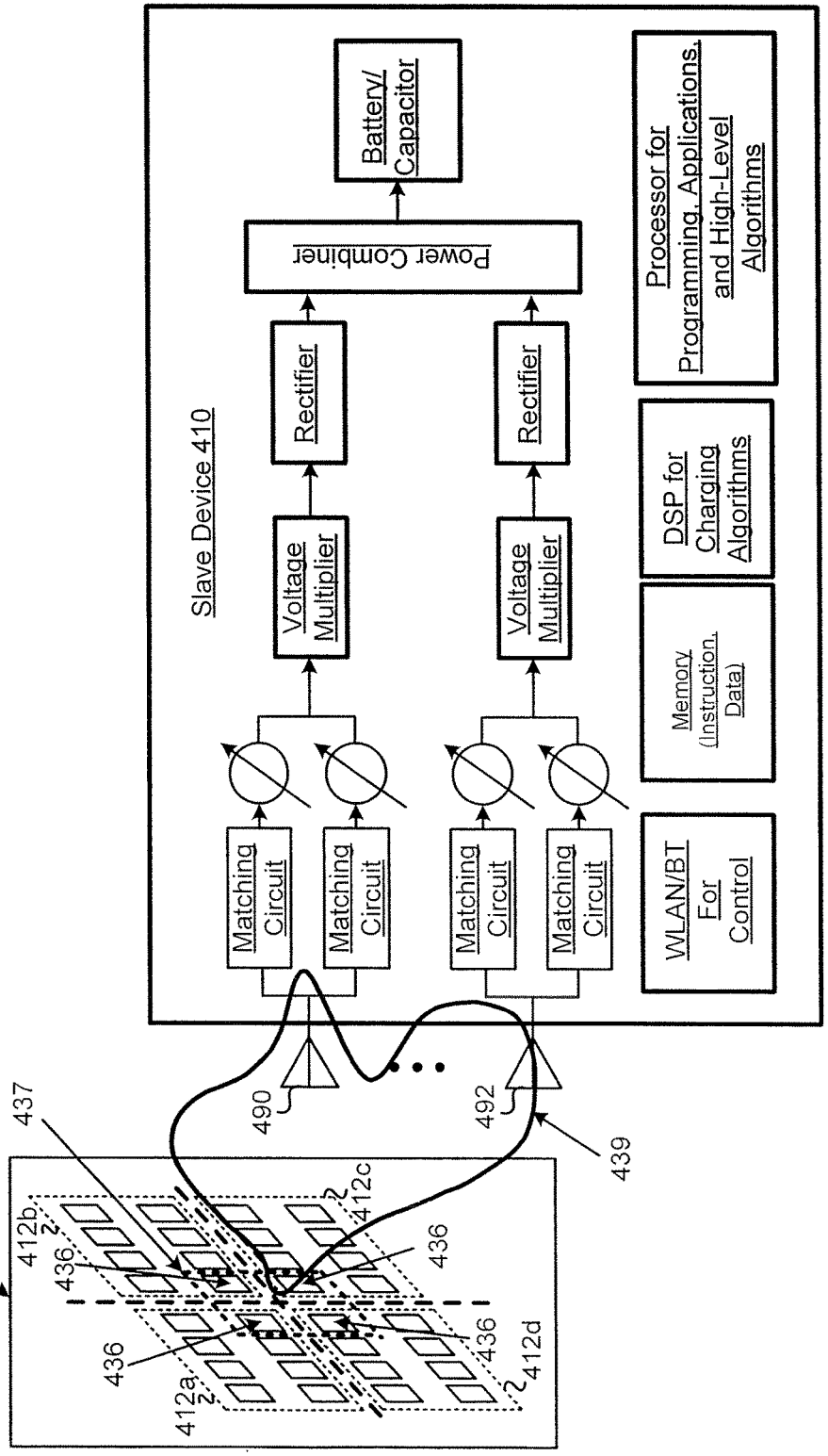
FIG. 4C illustrates an exemplary master unit in a customized beam pattern mode according to one implementation of the present application.

Referring to FIG. 4C, FIG. 4C illustrates an exemplary master unit in a customized beam pattern mode according to one implementation of the present application. As illustrated in FIG. 4C, master unit 408 forms and steers customized beam pattern 439 toward the antennas of slave device 410. In the present implementation, master unit 408 in FIG. 4C may correspond to at least one of master units 108a and 108b in FIG. 1, and master unit 208 in FIG. 2A. Slave device 410 in FIG. 4C may correspond to at least one of slave devices 110a, 110b, 110c and 110d in FIG. 1, and slave device 310 in FIG. 3. As illustrated in FIG. 4C, master unit 408 includes RFIC modules 412a, 412b, 412c and 412d, each of which includes an antenna array of antennas 436.

As illustrated in FIG. 4C, in the customized beam pattern mode, four antennas 436 from four different RFIC modules 412a, 412b, 412c and 412d are selected to form sub-array 437. Antennas 436 in sub-array 437 are utilized to form customized beam pattern 439 for transporting power to slave device 410, while the rest of the antennas in RFIC modules 412a, 412b, 412c and 412d are not utilized. The customized beam pattern mode is advantageous in situations where slave device 410 is located within the near-field range of master unit 408's antennas 436.

In the customized beam pattern mode, a cost function (or optimization criteria) is defined where the target criteria is to maximize the amount of power collected by the antennas of slave device 410. The available parameters are all the phase shifters and amplifiers driving antennas 436 of master unit 408. The operating RF frequencies of the selected group of antennas 436 may also be used as part of the optimization process. In the present implementation, customized beam pattern 439 illustrates an exemplary pattern created by the optimization process that is different than the single-beam and multi-beam patterns in FIGS. 4A and 4B, respectively. In the present example, customized beam pattern 439 is formed by master unit 408 to deliver optimum power to individual antennas 490 and 492 of slave device 410.

Although a single slave device has been discussed to describe how master unit 408 may dynamically reconfigure its RFIC modules 412a, 412b, 412c and 412d to select from one of the three modes shown in FIGS. 4A, 4B and 4C, it should be understood that master unit 408 may also dynamically reconfigure its RFIC modules 412a, 412b, 412c and 412d to select from one of the three modes based on the locations of multiple slave devices relative to master unit 408. For example, master unit 408 may select the single beam mode by using all or substantially all antenna arrays in RFIC modules 412a, 412b, 412c and 412d to charge a far-field salve device. Master unit 408 may select the multi-beam mode by using each respective antenna array in each of RFIC modules 412a, 412b, 412c and 412d to form a separate beam from each RFIC module to charge multiple near-field slave devices. Master unit 408 may select the customized beam pattern mode by using a customized combination of antennas in selected ones of RFIC modules 412a, 412b, 412c and 412d to charge a selected near-field slave device.

Figure 5A:
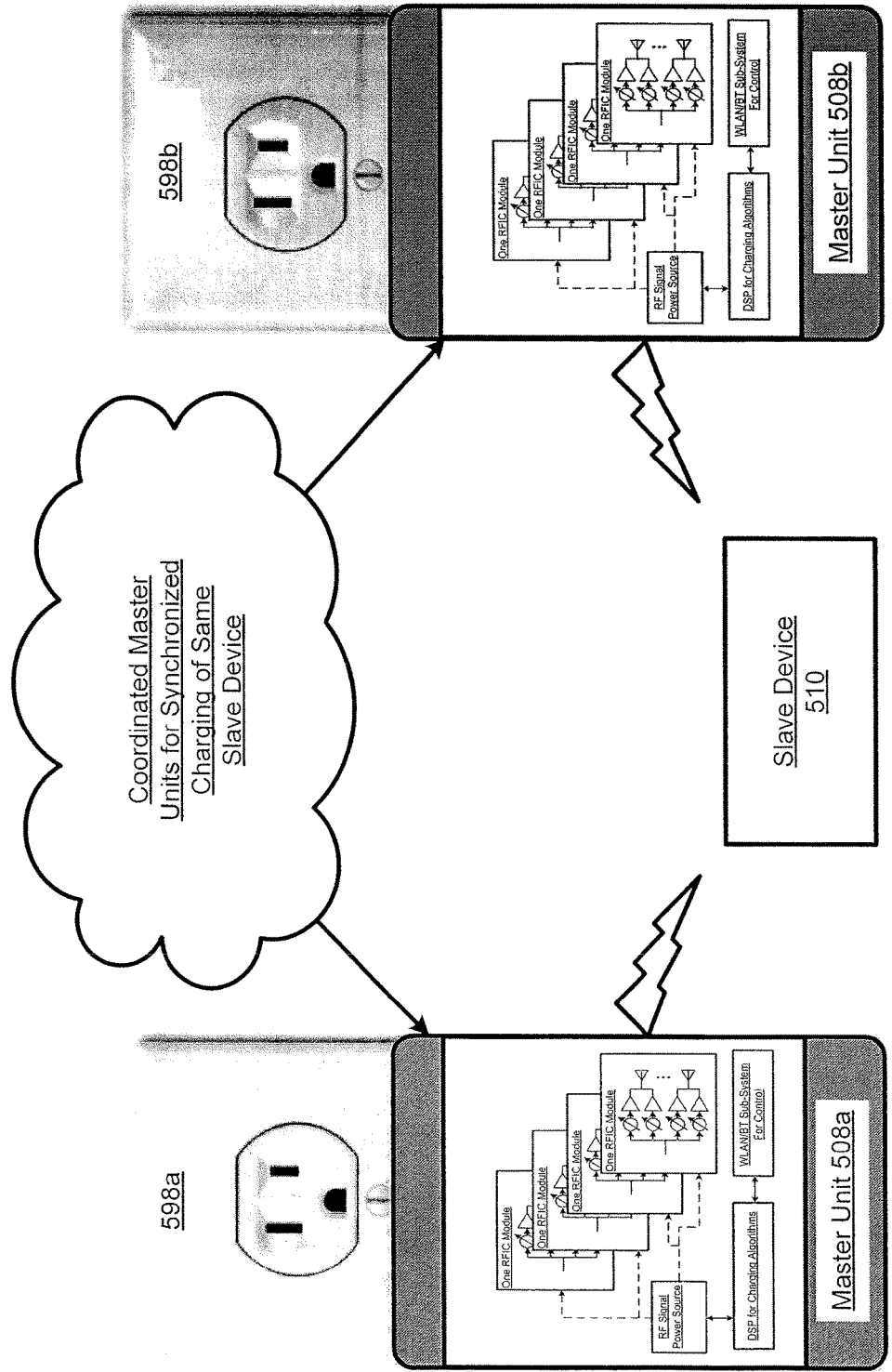
FIG. 5A illustrates an exemplary system for wireless charging according to one implementation of the present application.

Referring to FIG. 5A, FIG. 5A illustrates an exemplary system for wireless charging according to one implementation of the present application. As illustrated in FIG. 5A, master units 508a and 508b are utilized to deliver power to slave device 510. Master units 508a and 508b may correspond to respective master units 108a and 108b in FIG. 1. Also, master units 508a and 508b may each correspond to master unit 208 in FIG. 2A. In the present implementation, master units 508a and 508b may be coordinated through a feedback/control channel, such as WLAN/Bluetooth, to optimize the power delivery to slave device 510. In one implementation, slave device 510 syncs and coordinates master units 508a and 508b for optimum power delivery to slave device 510. For example, the relative phases of signals launched by master units 508a and 508b can be co-optimized for maximal power at the antennas of slave device 510. As illustrated in FIG. 5A, master units 508a and 508b are plugged into wall power outlets 598a and 598b, respectively. In another implementation, master units 508a and 508b can be built into fixtures or furniture (e.g., conference tables, walls, fitness machines), and have power cords connect them to a power source.

In one implementation master unit 508a hands-off the charging of slave device 510 to master unit 508b when slave device 510 moves further away from master unit 508a and moves towards master unit 508b. In one implementation, master unit 508a may use the location of slave device 510 and use a feedback/control channel to hand-off the charging to master unit 508b. In another implementation master unit 508a may use a network database such as database 106 to hand-off the charging to master unit 508b. In another implementation slave device 510 can initiate or coordinate the charging hand-off from master unit 508a to master unit 508b. In yet another implementation a network server such as server 104 can initiate or coordinate the charging hand-off from master unit 508a to master unit 508b.

Figure 5B:
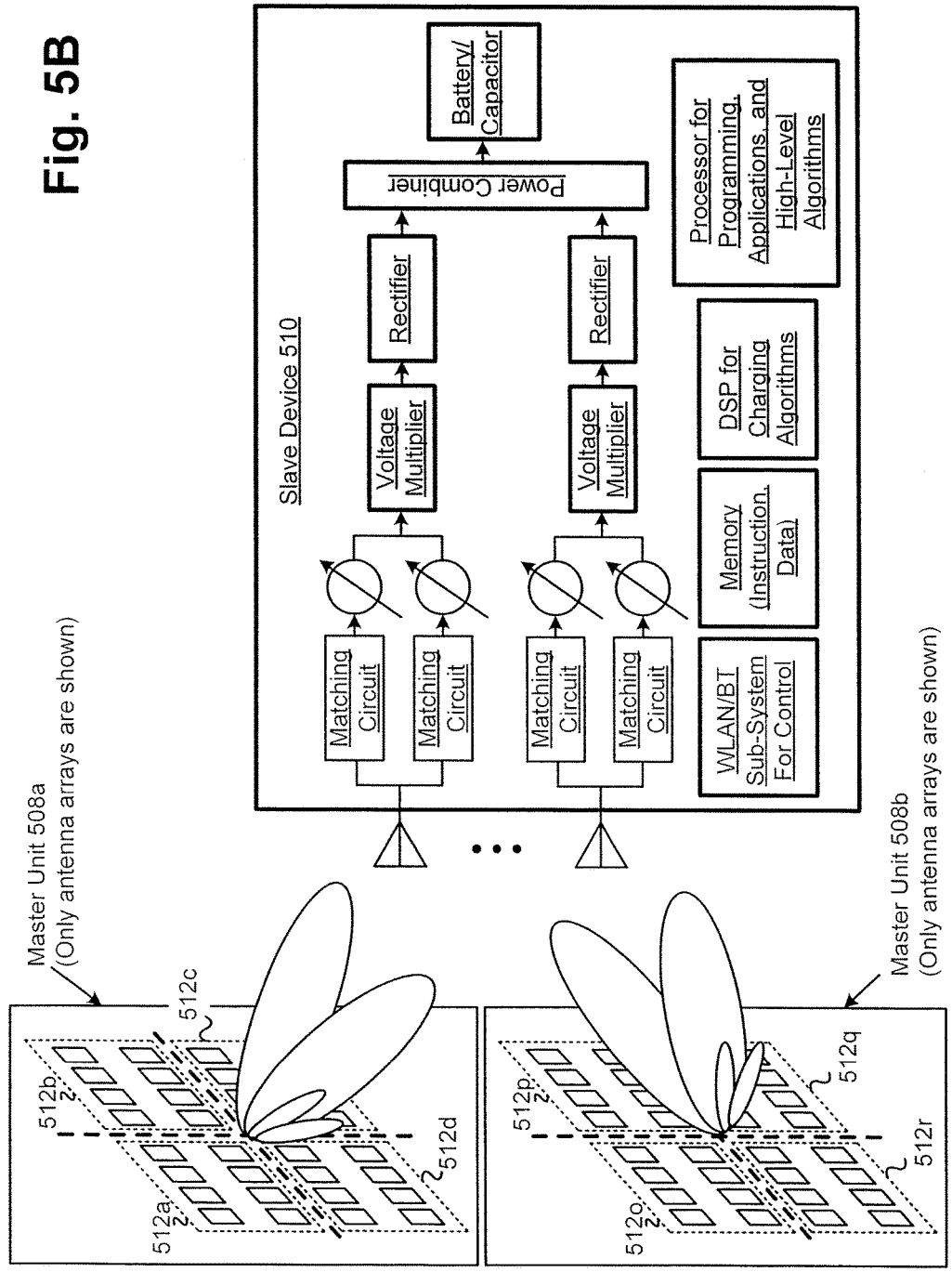
FIG. 5B illustrates exemplary system for wireless charging according to one implementation of the present application.

Referring to FIG. 5B, FIG. 5B illustrates exemplary system for wireless charging according to one implementation of the present application. As illustrated in FIG. 5B, master units 508a and 508b may correspond to master units 508a and 508b, respectively, in FIG. 5A. Master units 508a and 508b may each be connected to a power outlet (not explicitly shown in FIG. 5B), and coordinated with each other to charge slave device 510. As illustrated in FIG. 5B, master unit 508a includes RFIC modules 512a, 512b, 512c and 512d, each of which includes an antenna array. Master unit 508b includes RFIC modules 512o, 512p, 512q and 512r, each of which includes an antenna array. Master units 508a and 508b each form and steer one or more beams toward slave device 510. In one implementation, slave device 510 may use a low power wireless control link (e.g., a Bluetooth channel) to provide feedback to at least one of master units 508a and 508b. In some implementations, master units 508a and 508b may coordinate with each other through a wireless link or a network. In the present implementation, master units 508a and 508b are coordinated with each other to provide synchronized charging for slave device 510. For example, master units 508a and 508b are coordinated such that the beams from master units 508a and 508b add constructively at slave device 510. In some implementations, master units 508a and 508b may be configured to operate at two distinct RF frequencies, for example, in cases where constructive addition at the antennas of slave device 510 may not be achievable reliably.

Figure 6:
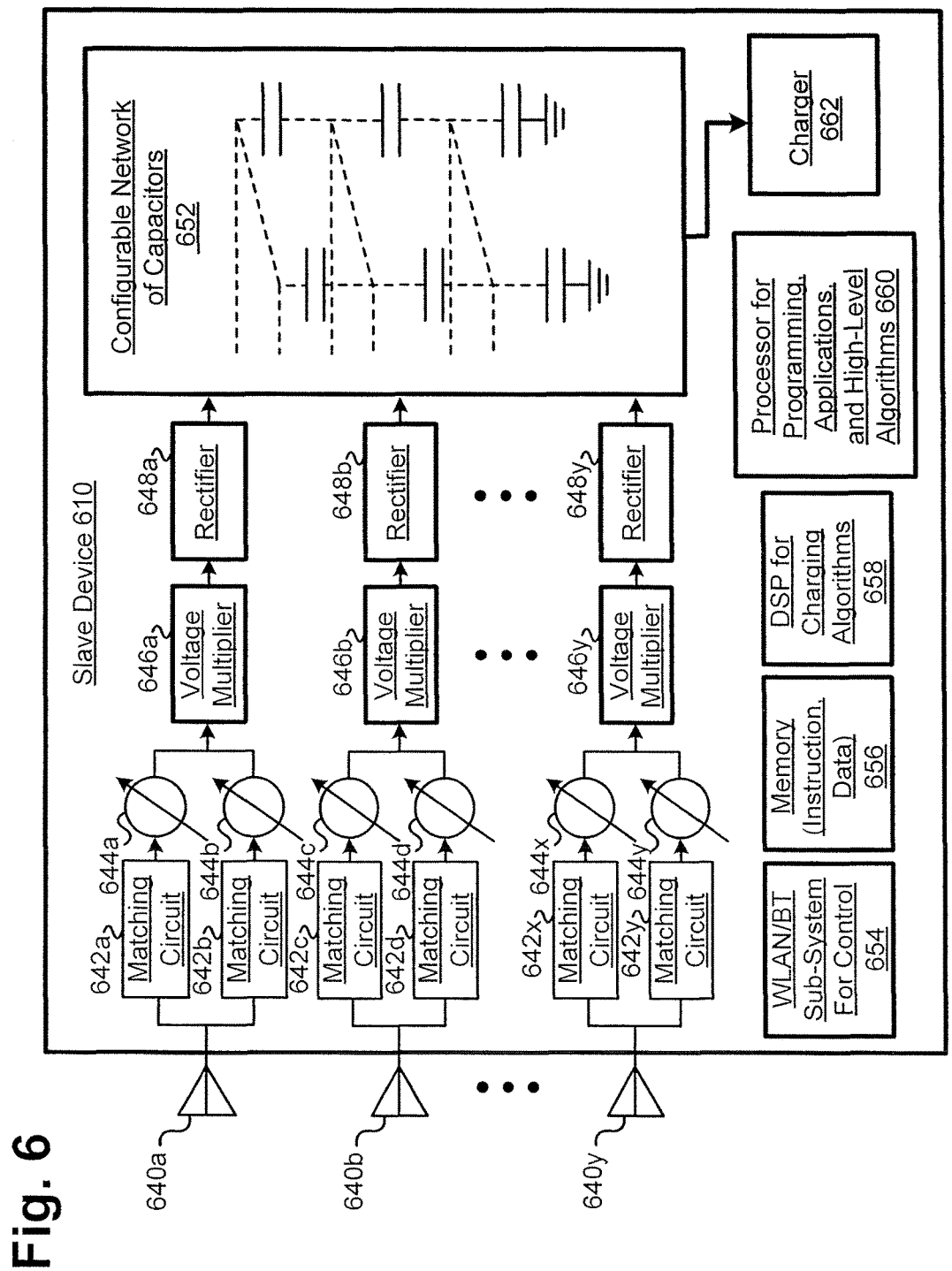
FIG. 6 illustrates an exemplary slave device having a configurable network of capacitors according to one implementation of the present application.

Referring to FIG. 6, FIG. 6 illustrates an exemplary slave device according to one implementation of the present application. As illustrated in FIG. 6, slave device 610 includes antennas 640a, 640b, through 640y, dual matching circuits 642a and 642b for antenna 640a, dual matching circuits 642c and 642d for antenna 640b, dual matching circuits 642x and 642y for antenna 640y, dual phase shifters 644a and 644b for antenna 640a, dual phase shifters 644c and 644d for antenna 640b, dual phase shifters 644x and 644y for antenna 640y, voltage multipliers 646a, 646b, through 646y, rectifiers 648a, 648b, through 648y, configurable network of capacitors 652, and charger 662. Slave device 610 may also include other components, such as WLAN/BT sub-system for control 654, memory 656, digital signal processor (DSP) for charging algorithms 658, and processor for programming, applications, and high-level algorithms 660.

As illustrated in FIG. 6, the capacitors collecting the harvested energy out of antennas 640a, 640b, through 640y (using two polarizations and two feeds out of each antenna) form configurable network of capacitors 652. Configurable network of capacitors 652 can be dynamically reconfigured to connect in series, in parallel, or in a combination thereof, for optimal setting using the voltage level present at the output of antennas 640a, 640b, through 640y (where the antenna voltage level is compared to the switch-on threshold of rectifiers 648a, 648b, through 648y). For example, when the received voltage level is very weak, all capacitors in configurable network of capacitors 652 are connected in series to generate an acceptable voltage level for charging the battery. Alternatively, when the received voltage level is strong, the capacities in configurable network of capacitors 652 are connected in parallel for maximum charging current. For voltages in between, the capacities in configurable network of capacitors 652 may utilize a combination of parallel and series configuration.

In one implementation, phase shifters 644a, 644b, 644c, 644d, through 644x, and 644y are optional for power combining across different polarizations and antennas before delivering the combined power to the corresponding rectifiers, such as rectifiers 648a through 648y. The reason is that in receiving power (as opposed to receiving data signals) from antennas 640a through 640y, the relative signal phases may not be as critical since no data is being sought and potential loss of data is not a concern. In a power receiving operation, it is the charging of configurable network of capacitors 652 that is important so that by proper voltage, current, and power monitoring in slave device 610, the correct configuration of capacitors are charged to ensure optimum voltage, current, and power delivered from configurable network of capacitors 652 to slave device 610. Since the received power signals by antennas 640a through 640y are being rectified by rectifiers 648a through 648y, the relative phases of the power signals received by antennas 640a through 640y will not significantly affect the output of rectifiers 648a through 648y delivered to configurable network of capacitors 652. Thus, in this implementation, phase shifters 644a, 644b, 644c, 644d, through 644x, and 644y are optional.

In some implementations, the configurations at the master unit are determined based on an optimization function for power delivery. The propagation effect between the transmission and reception can be modeled by an M×N complex matrix, where M is the number of antennas contained in the master unit, and N is the number of antennas contained in the slave device. Each antenna feed at the master unit (transmission) and/or the slave device (reception) sides may include a programmable phase shifter for altering the phase of the RF signals and a programmable amplifier for altering the power of the RF signals. This response is not limited to far-field and can be utilized even if in the near-field range.

The following is the procedure for optimization of power delivery to the slave device:

$$\begin{bmatrix} r_1 \\ \vdots \\ r_N \end{bmatrix} = \begin{bmatrix} h_{11} & \cdots & h_{1M} \\ \vdots & \ddots & \vdots \\ h_{N1} & \cdots & h_{NM} \end{bmatrix} \times \begin{bmatrix} \exp(j\varphi_1) \\ \vdots \\ \exp(j\varphi_M) \end{bmatrix} \times P, \quad \text{Equation (1)}$$

where $$H = \begin{bmatrix} h_{11} & \cdots & h_{1M} \\ \vdots & \ddots & \vdots \\ h_{N1} & \cdots & h_{NM} \end{bmatrix}, \quad \text{Equation (2)}$$

is the multiple input and multiple output (MIMO) channel response matrix with complex value for its elements. The master unit can utilize the M×N complex matrix H to determine phase shift values for antennas used in any of the three modes described with reference to FIGS. 4A through 4C. For example, the master unit may utilize H to determine the phase shift values for the customized combination of antennas used in the customized beam pattern mode shown in FIG. 4C. P is the power being transmitted by each of the antennas at the master unit. The phase shifters' vector can be defined as:

$$\Phi = \begin{bmatrix} \exp(j\varphi_1) \\ \vdots \\ \exp(j\varphi_M) \end{bmatrix}, \quad \text{Equation (3)}$$

where $\exp(j\varphi_1)$ is the effect of phase shifters incorporated at the master unit when configurable phase value $\varphi_1$ is applied. These values across all antennas at the master unit are optimized to lead to maximum power delivery to the slave device. Finally, $r_1$ through $r_N$ depict the received signals at the 1st through Nth antenna of the slave device under charge. Several optimization procedures may be deployed depending on the capabilities of the slave device.

With no loss of generality, the following are specific examples of power delivery optimization. In the present implementation, the master unit may utilize a cost function for configuring its corresponding phase shifters coupled to the antennas used in any of the three modes described with reference to FIGS. 4A through 4C to optimize charging for one or more slave devices. It is noted that the power delivery and power optimization techniques discussed herein (that utilize various cost functions) are particularly suitable for use in the customized beam pattern mode for optimizing the charging of a selected near-field slave device discussed in relation to FIG. 4C.

As an example of the cost function, the combined power received by the slave device's antennas can be expressed as:

$$|r_1|^2 + \ldots + |r_N|^2 = P^2 \times \Phi^* \times H^* \times H \times \Phi \quad \text{Equation (4)},$$

where $\Phi^*$ is the complex conjugate and transpose of $\Phi$. The vector $\Phi$ is then solved for maximizing the above cost function. One solution would be the Eigen-vector associated with the maximum Eigen value. Depending on the capacitor network and receiver implementation, other cost functions may be utilized for configuring the transmitter phase shifters. For example, a different cost function may be $$|r_1 + \ldots + r_N|^2 \quad \text{Equation (5)}.$$

In this case, the vector $\Phi$ is solved for maximizing this different cost function. In some implementations, the following cost function may be deployed:

$$|r_1|^k + \ldots + |r_N|^k \quad \text{Equation (6)},$$

for a k value other than 2. In some implementations, k=1, 1.5, or 2.5 may be utilized for cost function definition depending on the characteristics of components used in the slave device. The choice of cost function is driven or determined at least partly based on the structure in which the capacitors in configurable network of capacitors 652 in FIG. 6 are wired and interconnected.

In some implementations, power delivery techniques and architecture are applicable to both line-of-sight (LOS) conditions, as well as non-line-of-sight (NLOS) conditions. When a LOS path to a slave device is not available, the system may perform power delivery through a strong reflector in the environment. Under some implementations, the beam patterns creation would then point towards a strong reflector which in turn reflects the power towards the slave device. In some implementations, the environment is modified with strong reflectors that reflect most of the energy.

The power delivery techniques and architecture of this disclosure are applicable to both near-field and far-field regions. While the propagation model for near and far-field regions may be different, the implementations are applicable and functional in both regions.

For example, the channel response matrix given by:

$$H = \begin{bmatrix} h_{11} & \ldots & h_{1M} \\ \vdots & \ddots & \vdots \\ h_{N1} & \ldots & h_{NM} \end{bmatrix} \text{above,} \quad \text{Equation (2)}$$

would have a different characteristics and properties in the near-field versus the far-field. However, the same solutions and frameworks can be applicable for both near- and far-field regions.

In some implementations, a master unit (charging device) may be servicing multiple slave devices concurrently or in a time-multiplexed manner. In some implementations, the master unit may use different time slots to deliver power to different slave devices, where in each time slot a different beam pattern is utilized for best power delivery performance. In some implementations, the master unit may include multiple arrays (distributed antenna arrays within the master unit), where different distributed antenna arrays are activated and configured accordingly to deliver power to each of the slave devices concurrently and in the same frequency channel. In such implementations, the beam patterns of each antenna array within the master unit is configured for best power delivery performance towards the associated slave device.

Figure 7:
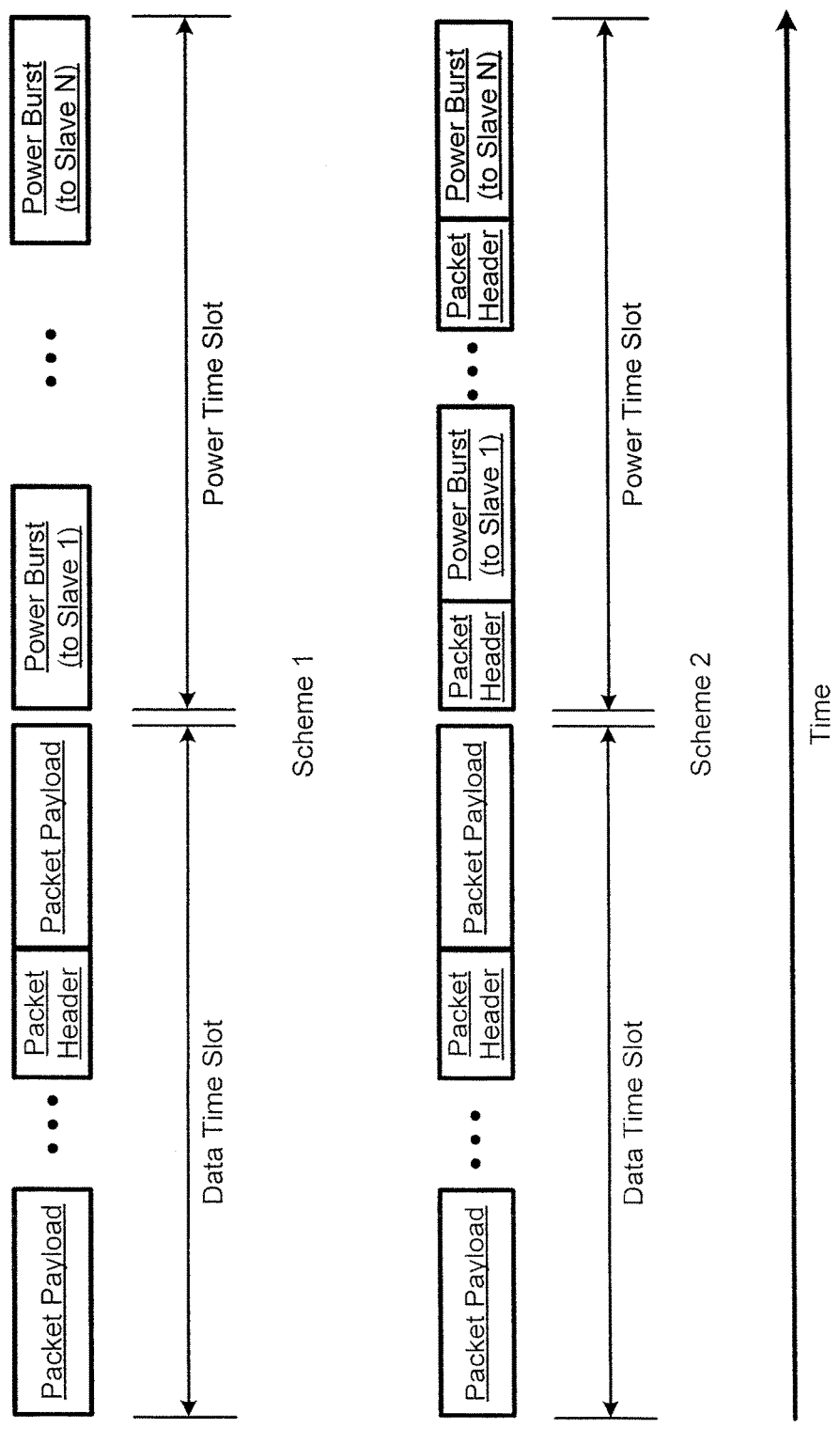
FIG. 7 illustrates a coexistence of multiplexed power and data delivery in time domain according to one implementation of the present application.

Referring to FIG. 7, FIG. 7 illustrates a coexistence of multiplexed power and data delivery in time domain according to one implementation of the present application. A system for wireless charging may utilize and share the same frequency band that is used for communication between the master unit and the slave devices in the vicinity, or even the same frequency band that is used for data communication between the master unit and the slave devices. FIG. 7 shows two time-domain multiplexing schemes for delivering both power (in the Power Time Slot) and data (in the Data Time Slot) in the same frequency band. The two exemplary schemes can be used in, for example, a WiFi wireless network. The "Data Time Slot" in FIG. 7 is reserved or scheduled for data delivery. Regular data packets are deployed by nodes and devices for data communication (e.g., WLAN packets being exchanged between devices). In some implementations, the access point or master unit may request and reserve a time slot period. This is allowed under many wireless systems (e.g., IEEE 802.11 MAC protocol). However, the time slot reserved under the IEEE 802.11 protocol is subsequently utilized for sending power delivery signals or power bursts. That is due to the fact that those time slots were previously negotiated and reserved by the master unit. The advantage is that since those time slots were previously negotiated and reserved by the master unit, other WLAN devices in the vicinity would avoid using the "Power Time Slots" of FIG. 7 for data packet delivery and hence prevent losing those data packets due to interference by the power bursts.

As shown in FIG. 7, two power time slot variations may be deployed, as noted by scheme 1 and scheme 2. In scheme 1, the master unit transmits a packet header and a packet payload in a data time slot, followed by a power burst in a power time slot for charging at least one slave device. In scheme 1, the entire packet length is utilized for power delivery with no information embedded. In scheme 2, the master unit transmits a packet header and a packet payload in a data time slot, followed by another packet header and a power burst in a power time slot for charging at least one slave device. In scheme 2, an IEEE 802.11 compliant (or any other standard utilized in the band of operation) packet header is pre-appended to the power delivery portion of the power burst. In this implementation, some information bits can be transmitted to the slave device. Furthermore, the header can be decoded by other WLAN devices in the vicinity. These WLAN devices would then decode the packet header portion (as is typically done by the WLAN devices for listening and monitoring channel usage) and estimate the length of the packet. These devices would then know the length of the power burst period following the header, and avoid initiating or transmitting any data in that period.

Referring to FIG. 8, FIG. 8 illustrates a coexistence of multiplexed power and data delivery in frequency domain according to one implementation of the present application that can be utilized in, for example, a WiFi wireless network. FIG. 8 illustrates implementations where coordination in the frequency domain is utilized for concurrently transporting data and power (to the same device or to different devices). In scheme 1, the master unit is configured to transmit a power burst in a frequency band between two data packet frequency bands. In scheme 1, the gap between the two standard frequency bands is utilized for transmitting a narrow bandwidth but high power burst for power delivery. The gap typically exists in many standard wireless systems (e.g., WLAN channels in 2.4 GHz and 5 GHz). This is feasible because power delivery can be achieved over a very narrow channel/frequency band (unlike data links that require higher bandwidth for throughput and capacity). In scheme 1, the power level of the power burst is adjusted to avoid saturating the receivers of the slave devices that are decoding frequency bands 1 and 2 (hence avoid corrupting their data packets).

In scheme 2 of FIG. 8, the master unit is configured to transmit a power burst in a narrow frequency band within a data packet wide frequency band. In scheme 2, the two signals, one for data and another for power, are effectively transmitted over the same frequency band and at the same time. The protection for the data waveform is achieved by the very narrowband nature of the power burst and the wideband nature of the data packet. In this case, the data receiver on the slave device nulls the small portion of frequency corrupted by the power burst, for example, by using a sharp frequency notching filter. Given the small ratio between the narrow frequency band of the power burst and the wide frequency band of the data packet, the impact on the quality of the decoded data can be minimal and manageable. In scheme 2, the master unit and the slave device (and other WLAN devices in the vicinity) coordinate and/or negotiate the exact narrow frequency band of the power burst. This enables all the other devices that are receiving data packets in the same wide frequency band to know in advance the frequency domain location of the power burst and filter/notch it out accordingly.

In another implementation, in scheme 2 of FIG. 8, the power burst may be aligned to fall onto the portion of the frequency band that is used as guard subcarriers, or direct-current, or embedded pilot subcarriers. For example, in many IEEE 802.11, OFDM, and PHY specifications, several subcarriers are not loaded with information data. Most notably, guard and DC subcarriers are provisioned for assisting the receiver and hence do not carry information bits. In this implementation, the power burst is designed and generated to fall onto those subcarriers (hence minimizing the notch-filtering requirements at the data receivers).

In some implementations, the same frequency band may be utilized for delivering both wireless power and wireless data between the master unit and the slave device. In this case, similar co-existence and scheduling methods may be used by the master unit. For example, the master unit could schedule and allocate non-overlapping transmit time slots for power and data delivery. The duty cycle of these time slots may depend on several system parameters including, for example, target communication throughput and level of battery charge at the slave device. In this case, the master unit informs the slave device about the scheduled time slots for power and data delivery for the next time interval. This allows the slave device to switch accordingly between the power harvesting mode and the data reception mode at the expected time slots. Similarly, non-overlapping frequency bands may be utilized by the master unit to concurrently deliver power and data to the slave device. In this case, the power delivery can be achieved over a narrow frequency band, whereas data delivery may require wider frequency band for efficient data communication. The master unit takes this tradeoff into account when allocating and reserving frequency bands for power and data delivery. For example, the master unit allocates very narrow frequency bands for power delivery, and allocates available wider frequency bands for data delivery. Additionally, the header portion (PHY or MAC) of data packets during data delivery slots may be utilized to inform the slave device whether the following time slot is going to be utilized for power delivery or not. This allows the slave device to have sufficient time for preparing and switching to the power harvesting mode.

FIGS. 7 and 8 depict two coexistence mechanisms: one coordinated in the time domain and another in the frequency domain. In some implementations, a combination of time domain and frequency domain coexistence methods may be deployed. For example, a master unit (charger unit) may use time scheduling to deliver power bursts in one frequency band to two slave devices, while relying on using a different frequency band to deliver power bursts to a third slave device.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A master unit for wirelessly charging a plurality of slave devices, said master unit comprising:
   a plurality of radio frequency integrated circuit (RFIC) modules, each of said plurality of RFIC modules being associated with a unique or a shared antenna array;
   said master unit having at least two charging modes comprising a multi-beam mode and a customized beam pattern mode;
   said master unit using each respective one of said unique or said shared antenna array to form beams from said plurality of RFIC modules in said multi-beam mode;
   said master unit using a customized combination of antennas to form a customized beam pattern in said customized beam pattern mode.

2. The master unit of claim 1 wherein said master unit is configured to dynamically select from one of said multi-beam mode and said customized beam pattern mode based on a location of each of said plurality of slave devices relative to said master unit.

3. The master unit of claim 1 wherein said master unit is configured to coordinate with another master unit to charge said plurality of slave devices.

4. The master unit of claim 1 wherein said master unit utilizes a channel response matrix to determine phase shift values for said customized combination of antennas used in said customized beam pattern mode.

5. The master unit of claim 1 wherein said master unit utilizes a cost function in said customized beam pattern mode to optimize charging said plurality of slave devices.

6. The master unit of claim 5 wherein said cost function is determined at least partly based on a configurable network of capacitors in each of said plurality of slave devices.

7. The master unit of claim 1 wherein said master unit transmits a packet header and a packet payload in a data time slot, followed by a power burst in a power time slot for charging said plurality of slave devices.

8. The master unit of claim 1 wherein said master unit transmits a packet header and a packet payload in a data time slot, followed by another packet header and a power burst in a power time slot for charging said plurality of slave devices.

9. The master unit of claim 1 wherein said master unit is configured to transmit a power burst in a frequency band between two data packet frequency bands.

10. The master unit of claim 1 wherein said master unit is configured to transmit a power burst in a narrow frequency band within a data packet wide frequency band.

11. A method for wirelessly charging a plurality of slave devices, said method comprising:
   using a plurality of radio frequency integrated circuit (RFIC) modules, each of said plurality of RFIC modules being associated with a unique or a shared antenna array;
   using a master unit having at least two charging modes comprising a multi-beam mode and a customized beam pattern mode;
   forming beams from said plurality of RFIC modules in said multi-beam mode by using each respective one of said unique or said shared antenna array;
   forming a customized beam pattern in said customized beam pattern mode by using a customized combination of antennas.

12. The method of claim 11 wherein said master unit is configured to dynamically select from one of said multi-beam mode and said customized beam pattern mode based on a location of each of said plurality of slave devices relative to said master unit.

13. The method of claim 11 wherein said master unit is configured to coordinate with another master unit to charge said plurality of slave devices.

14. The method of claim 11 wherein said master unit utilizes a channel response matrix to determine phase shift values for said customized combination of antennas used in said customized beam pattern mode.

15. The method of claim 11 wherein said master unit utilizes a cost function in said customized beam pattern mode to optimize charging said plurality of slave devices.

16. The method of claim 11 wherein said master unit transmits a packet header and a packet payload in a data time slot, followed by a power burst in a power time slot for charging said plurality of slave devices.

17. The method of claim 11 wherein said master unit transmits a packet header and a packet payload in a data time slot, followed by another packet header and a power burst in a power time slot for charging said plurality of slave devices.

18. The method of claim 11 wherein said master unit is configured to transmit a power burst in a frequency band between two data packet frequency bands.

19. The method of claim 11 wherein said master unit is configured to transmit a power burst in a narrow frequency band within a data packet wide frequency band.

* * * * *